United States Patent Office 2,749,954
Patented June 12, 1956

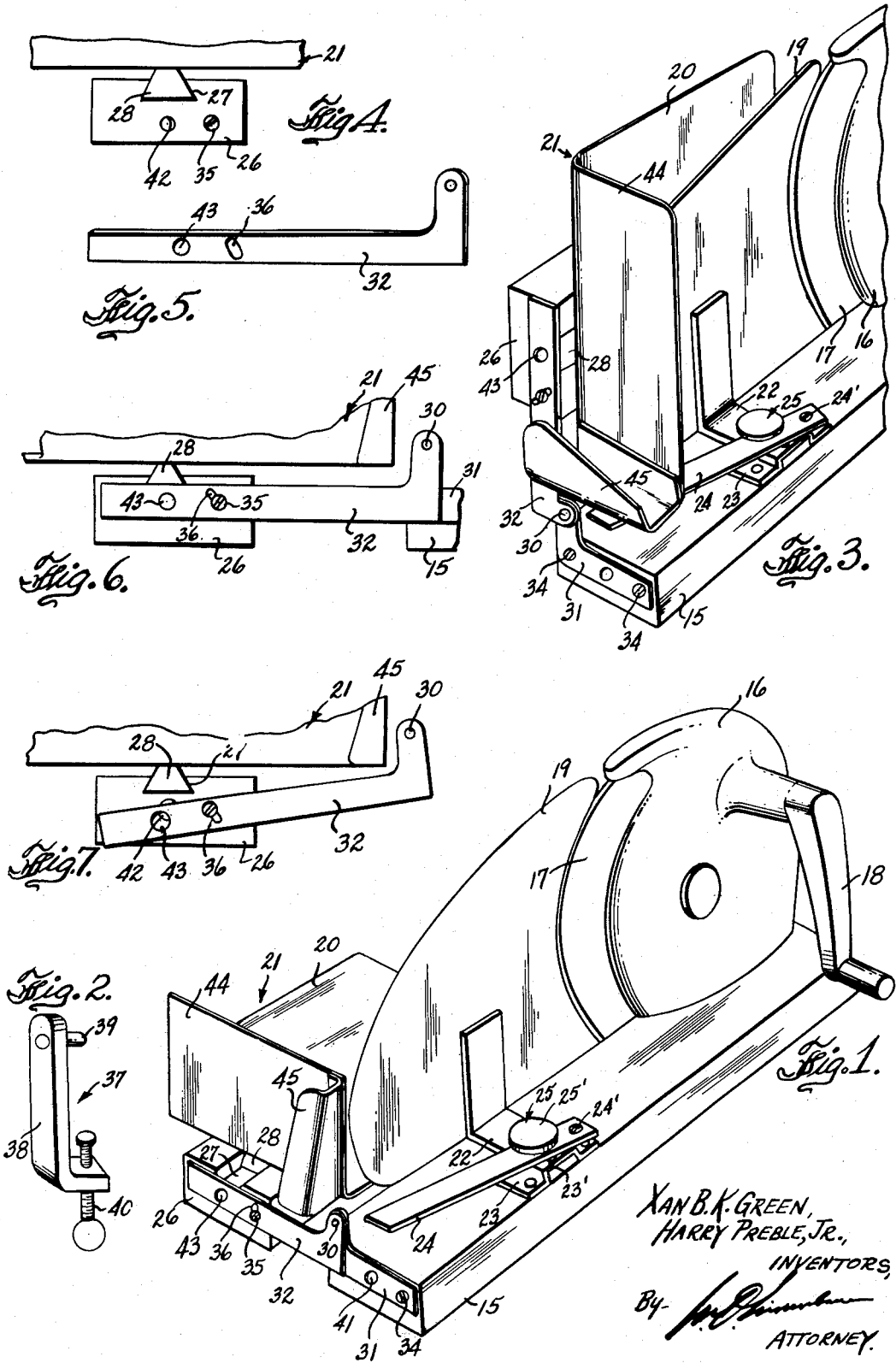
June 12, 1956 — X. B. K. GREEN ET AL — 2,749,954
BASE CONSTRUCTION FOR COMPACTLY FOLDING SLICING MACHINES AND THE LIKE
Filed June 18, 1953

2,749,954

BASE CONSTRUCTION FOR COMPACTLY FOLDING SLICING MACHINES AND THE LIKE

Xan B. K. Green, New Paltz, and Harry Preble, Jr., Cross River, N. Y., assignors to General Slicing Machine Co., Inc., Walden, N. Y., a corporation of New York Application June 18, 1953, Serial No. 362,568

2 Claims. (Cl. 146—102)

The present invention relates to a foldable food slicing machine of the type including a rotary disc blade to which the food to be sliced is fed by a reciprocatable, slidably mounted carriage.

An object of this invention is to provide a novel and improved food slicing machine of the type mentioned, whose construction is comparatively inexpensive and which is easily folded compactly when not in use. Also, the food carriage thereof is easily removable to be cleaned, but is maintained in its track and against removal therefrom when the machine is clamped onto a counter or table top in use condition. In co-pending applications for patents, we have provided inexpensive and simple constructions to afford easy removal of the blade for cleaning purposes and such are adaptable to be incorporated in the present invention to increase cleaning convenience.

Another object of this invention is to provide novel and improved machines for the slicing of food, of the kind set forth, which are efficient in carrying out the purposes for which they are designed.

Other objects and advantages will become apparent as this disclosure proceeds.

In the accompanying drawings forming part of this specification, similar characters of reference indicate corresponding parts in all the views.

Fig. 1 is a perspective view of a food slicing machine embodying the teachings of this invention. The machine is here shown in use condition, requiring only to be properly clamped onto a table or counter, as will be explained.

Fig. 2 is a perspective view of one of the clamps which may be used for such purpose. It is here a separate part.

Fig. 3 is a fragmentary perspective view of the said machine shown in compact folded condition, to be put away.

Fig. 4 is an enlarged fragmentary view showing the front end of a part of the machine's base which serves as a track for the food carriage. The said carriage is here shown mounted on the track.

Fig. 5 is a perspective view of a hinge part which is associated with said base member and also has the function to act as a stop to keep the food carriage on the track.

Fig. 6 is a view similar to Fig. 4, showing said hinge part in position on said base member, when the machine is in use condition.

Fig. 7 is a view similar to Fig. 6, showing the said hinge part moved to afford release of the food carriage from off the track, so that said carriage can be easily cleaned.

In the drawings, the numeral 15 designates a base part which may be of wood. On it is mounted a blade housing 16, carrying thereon the rotatably mounted disc blade 17 which is driven through suitable gearing housed in member 16, by means of a crank handle 18, as is well known in the art. Also mounted on said base part is the gage plate 19, whose plane is changed in accordance with the thickness of slice desired; the distance between the adjacent planes of said blade 17 and the gage plate 19, being the thickness of slice cut off food carried on the horizontal platform 20 of the reciprocatably mounted carriage 21. The gage plate 19 is shiftable, but is always in a plane parallel to the plane of the cutting blade 17. The numeral 22 denotes a rigid strip extending laterally from the gage plate 19. This strip member lies on the base part 15 and is slidably positioned in the track offered by the saddle piece 23 mounted on said base part. An upwardly forwardly extending lever 24 is pivoted at its rear end as shown at 24', and is provided with a hole through which is positioned the upper unthreaded part of a screw 25 having the head 25'. The shank of said screw, also is positioned through the elongated slot 23' in the saddle piece, and the lower end of said screw is threadedly engaged in said strip member 22. Upon loosening said screw so that its head rise out of contact with the lever 24, it is evident that the gage plate 19 may be moved in the direction the lever is manually moved, and such gage plate is fixed in any position so set, by turning the screw until its head tightly engages the lever 24. This adjustment means is a mere example of its possible construction, but it is to be noted that the operating lever thereof extends practically to the front end of the machine forwardly of the gage plate 19.

The numeral 26 indicates another separate elongated base part which may also be of wood. It is positioned in spaced parallel relation alongside the base part 15. In use position, it presents in its top surface, the dove-tail channel 27 along its entire length, open at least at one end so as to permit removal and resetting of the food carriage 21, which latter on its undersurface has fixed thereon the dove-tail block 28 adapted for sliding engagement in said channel, for movement of the food carriage along said base part 26, as in a track.

On the front and rear ends of the base parts 15 and 26, there is carried a separate hinge part respectively. The hinge parts 31 on the base part 26 are the same. The hinge parts as 32 may be the same, except that the one at the rear of the machine which is not shown is securely mounted, while the one at the front of the machine is mounted for limited movement as is provided by the slanted slot 36 through which is a headed fixed screw 35 extending from the forward edge of said base part 26.

The hinge parts at the front of the machine are pivoted at 30, while those at the rear (which are not shown) are pivoted in similar fashion so that both hinges formed have a common horizontal axis through point 30 along the length of the machine, whereby the base part 26 can be swung upward bringing the food carriage 21 to a position where its platform 20 lies parallel and close to the plane of the gage plate 19 and the plane of the disc blade 17. The hinge axis line is above and within the confines of the base part 15, hence it is evident that the hinge parts 32 extend laterally from the base part 26 and span the space between the base parts 15 and 26. All hinge parts extend across the base ends on which they are respectively carried, particularly so that the hinge parts 31 may be securely mounted by means of the screws 34 onto the base part 15, and so that the rear hinge part 32 may also be securely mounted on base part 26.

The numeral 37 designates generally one of a pair of similar clamps used to mount the machine securely onto a table or counter top. This clamp comprises an L-shaped body 38 having a pin 39 which extends from one of its arms over its other arm, and a clamping screw 40 threadly engaged in its said other arm and extending therethrough spaced from and parallel to its first arm. These clamps may be used at the front of the machine only. So at the front of the machine, in each front end of each base part, there is a socket to receive a clamp pin. Such socket is shown at 41 in the base part 15, as passing also through the hinge part 31 at the front end of the machine. Another such socket in the base part 26, is indicated at 42. It is to be noted that the front hinge part 32 is provided with a hole 43 which is of the size of a socket hole for a clamp pin. When the machine is in use condition as in Fig. 1, the hole 43 registers with the socket 42, and the front hinge part 32 is across at least part of the open end of the dove-tail channel 27. With the machine in this use condition, the rear hinge part akin to 32 will also be at least in part across the rear end of said channel 27. It is evident that the hinge parts 32 will act as stops and maintain the food carriage 21 within its track on the base part 26, when base part 26 is clamped to a table top by means of a clamp 37. Upon removal of the clamp from said base part 26, the latter can be swung on the screw 35 and slid along the slot 36, to such position as in Fig. 7, where the front hinge part 32 is away from and is clear of the channel 37, whereupon the food carriage 21 can be removed from the machine, to be cleaned, and then reset again.

The food carriage 21 has a front wall 44 extending upright from the food platform 20. The side end of said wall nearest the plane of the cutting blade 17, has a forwardly extending finger shield 45. There is sufficient space between the front hinge parts 31, 32 and the edge of the gage plate 19, to admit said wall 44 and its finger shield 45, when the base part 26 is swung upwardly to place the machine in folded condition as illustrated in Fig. 3. The hinge axis line is sufficiently high so that when the machine is in folded condition, said wall and finger shield shall be above and clear the gage plate adjustment lever 24. Not shown, but well known in the art, the machine also includes a spurred plate for pushing the food on the carriage platform 20 against the gage plate 19. This spurred plate is in use position, a movable upright wall on the food platform 20, in normal relation to the wall 44. Such spurred plate, as is usual in many machines well known, has provision to be guided for sliding movement in planes parallel to itself; the top edge of the wall 44, serving as a track means therefor. When the machine is folded, said pronged plate having first been removed from the food carriage, may be set to rest on base part 15, and the handle 18 may also be made removable and fit on said base part. Thus the entire machine and its separable parts, make a compact package for shipment and storage.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

We claim:

1. In an article of the character described, a base comprising a pair of elongated first and second base parts arranged one alongside the other and adapted to rest on a common plane; the first base part having a track means therealong, a track-engagement means in engagement with and slidable along said track means; said track-engagement means being removable from the track means when slid past one end of the first base part; said track means having an entrance at said end of the first base part wherein said track engagement means may enter into or leave the track means, a hinge comprising a first hinge part mounted on and having limited movement on said end of the first base part; the first hinge part closing said entrance and a second hinge part mounted on the second base part and pivotally connected with the first hinge part about an axis parallel to the length of the base parts whereby the first base part together with the first hinge part thereon, may be swung upwardly towards the second base part; said first base part and the first hinge part being relatively movable whereby the entrance to the track means is unobstructed by the first hinge part whereupon the track-engagement means is free for removal from the track means.

2. The structure as defined in claim 1, wherein the track means is a channel having an open end commencing at an end edge of the first base part to provide the entrance and exit for the track engaging means therein and therefrom and wherein the first hinge part of the hinge is in abutment with said end edge, and across said entrance when said base parts stand on a single plane.

References Cited in the file of this patent

UNITED STATES PATENTS

| | | |
|---|---|---|
| 1,147,923 | Bond | July 27, 1915 |
| 1,273,138 | Bond | July 23, 1918 |
| 2,091,632 | Friedman | Aug. 31, 1937 |
| 2,182,708 | Shlevin | Dec. 5, 1939 |
| 2,611,406 | Preble | Sept. 23, 1952 |

FOREIGN PATENTS

| | | |
|---|---|---|
| 484,596 | Germany | Oct. 19, 1929 |
| 499,181 | Germany | June 3, 1930 |